No. 696,786.  
G. W. ZELIFF.  
MECHANISM FOR CONVERTING MOTION.  
(Application filed Jan. 18, 1902.)  
Patented Apr. 1, 1902.

(No Model.)

UNITED STATES PATENT OFFICE.

GEORGE W. ZELIFF, OF EYOTA, MINNESOTA.

MECHANISM FOR CONVERTING MOTION.

SPECIFICATION forming part of Letters Patent No. 696,786, dated April 1, 1902.

Application filed January 18, 1902. Serial No. 90,294. (No model.)

*To all whom it may concern:*

Be it known that I, GEORGE W. ZELIFF, a citizen of the United States, residing at Eyota, in the county of Olmsted and State of Minnesota, have invented new and useful Improvements in Mechanism for Converting Motion, of which the following is a specification.

This invention relates to certain new and useful improvements in mechanism for converting an oscillating motion into a rotary one for such uses as the same may be applied.

The mechanism which I have illustrated embodies a ratchet, pawls, or grip devices, a lever which is connected to said grip devices, and springs for holding them in engagement with the ratchet; and the invention consists in the construction and arrangement of the parts, as will be hereinafter set forth.

Figure 1:
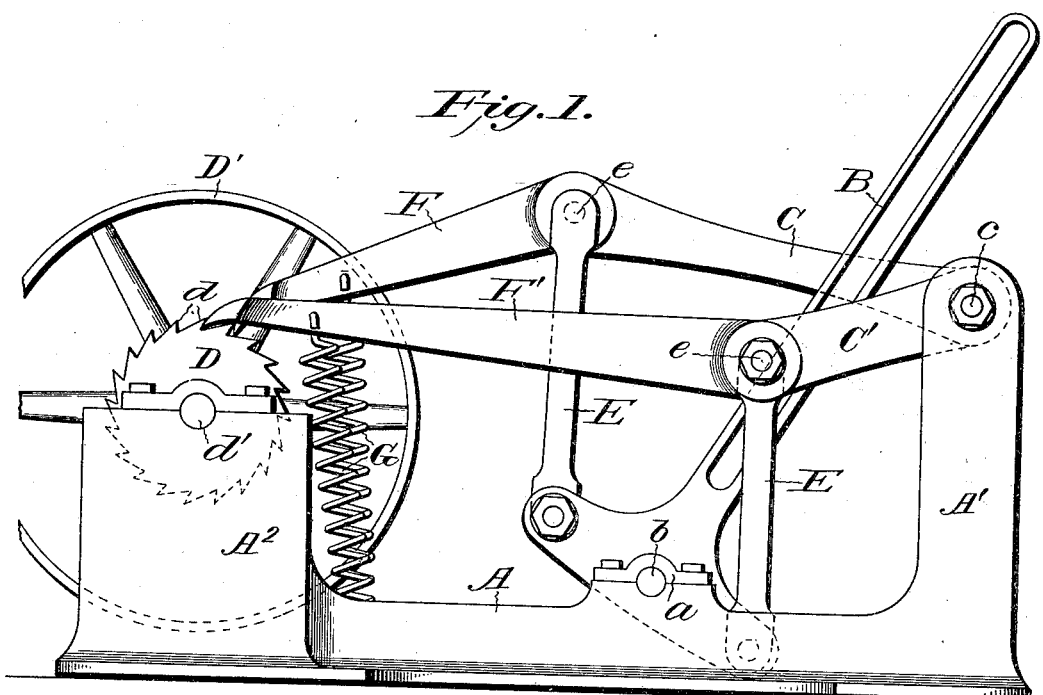
Figure 2:
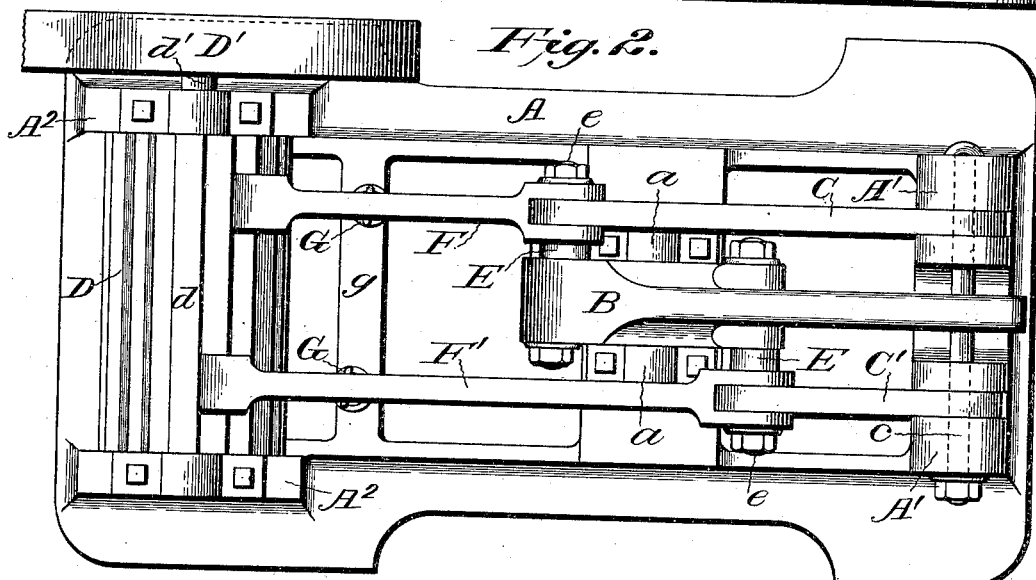

In the accompanying drawings, which illustrate one embodiment of my invention, Figure 1 is a side elevation of a manually-operated device for converting an oscillatory or rocking movement into a rotary motion. Fig. 2 is a plan view.

A refers to a frame having bearings $a$, in which is fulcrumed the T-head of a lever B, and near one end of the frame are uprights carrying a bolt or pivot $c$, which connects to the frame-arms C C'. The opposite end of the frame A from the uprights A' is provided with upwardly-projecting portions $A^2$, between which there is mounted a cylinder or ratchet-wheel D, which is provided with longitudinal ratchet-teeth $d$, and upon one end of the shaft $d'$ there may be mounted a flywheel D', the other end, if desired, being provided with a driving-pulley.

The lever B is mounted so as to oscillate on a shaft $b$, and from each side of the shaft or fulcrum extend heads, and to the heads are pivoted links E E', the links extending upward to engage bolts $e$ $e$, which connect the links to the arms C C' and said links and arms to pawls F F', which pawls are provided near their ends with springs G, the springs being attached at their lower ends to a crossbar $g$ of the frame A.

By the construction shown it will be noted that the joints connecting the arms to the pawls and the links thereto and to the head of the lever are positioned approximately above the ends of the T-headed lever B, and to provide for such construction the arm C is much longer than the arm C' and the pawl F shorter than the pawl F'. In other words, the grip devices for the ratchet-wheel are jointed approximately above the ends of the head of the lever.

As the lever B is rocked it will raise the joint of one of the grip devices or pawls and lower that of the other one, thus practically lengthening out or straightening one of the pawls to move its grip end forward, which being in engagement with a ratchet-tooth turns the ratchet and the wheel. While the ratchet is being moved the other grip device is being moved over the ratchet-wheel in an opposite direction. By this construction each time that an arm and pawl are brought on a line with each other or toward such a line the wheel is moved forward or given a rotary impulse. The springs hold the ends of the pawls in constant engagement with the ratchet.

The lever may be rocked upon its fulcrum manually either by direct engagement or means for oscillating the lever may be provided. This device for converting motion may be used wherever it is desired to convert an oscillating motion into a rotary one, and by means of the lever and jointed grip devices great power may be obtained.

Having thus described my improvement or invention, what I claim as new, and desire to secure by Letters Patent, is—

1. In a device for converting motion, the combination of a lever having extensions on each side of its fulcrum, links pivoted to the extensions of the lever, jointed pawls pivoted to the links, a support to which one end of the jointed pawls are pivoted, and a ratchet-disk rotatably supported to be engaged by the free ends of the pawls, substantially as shown.

2. In a device for converting motion, the combination with a T-headed lever fulcrumed between its heads, a link connected to each end of the head of the lever, arms pivoted upon a support said arms being of different lengths, pawls connected to the arms and to the links, a ratchet-wheel with which the ends of the pawls engage and springs for holding the pawls in engagement with the ratchet-wheel, substantially as shown and for the purpose set forth.

3. In a device for converting an oscillating motion into a reciprocating one, a T-headed lever fulcrumed upon a support, arms pivoted so as to be maintained in line with each other upon the support, one of the arms being longer than the other, pawls of different lengths pivoted to the arms, a ratchet-wheel with which the pawls engage, and links connecting the arms and pawls to the lever so that the joints between the pawls and arms will be alternately raised and lowered, substantially as set forth.

In testimony whereof I have hereunto set my hand in presence of two subscribing witnesses.

GEORGE W. ZELIFF.

Witnesses:
L. J. ETLING,
REX R. GOULD.